United States Patent
Spaniel

(10) Patent No.: US 6,364,806 B1
(45) Date of Patent: Apr. 2, 2002

(54) MULTI-MOTOR DRIVE FOR MOTOR VEHICLES

(75) Inventor: Dirk Spaniel, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/608,949

(22) Filed: Jun. 30, 2000

(30) Foreign Application Priority Data

Jul. 9, 1999 (DE) .......................................... 199 32 118

(51) Int. Cl.$^7$ ............................. B60K 1/02; B60K 41/04
(52) U.S. Cl. ................................ 477/3; 477/15; 477/20; 180/65.7
(58) Field of Search ............................... 477/3, 15, 20; 180/65.7, 65.8

(56) References Cited

U.S. PATENT DOCUMENTS

| | | | |
|---|---|---|---|
| 5,101,924 A | * | 4/1992 | Yamagiwa et al. |
| 5,289,890 A | | 3/1994 | Toyoda et al. ............. 180/65.8 |
| 5,403,244 A | * | 4/1995 | Tonkersley et al. ........... 477/20 |
| 5,453,930 A | * | 9/1995 | Imaseki et al. ............ 180/65.8 |
| 5,655,990 A | * | 8/1997 | Doyama et al. ............... 477/15 |
| 5,879,265 A | * | 3/1999 | Bek .............................. 477/3 |
| 5,991,683 A | * | 11/1999 | Takaoka et al. ................ 477/3 |
| 6,022,287 A | * | 2/2000 | Klemen et al. ............ 180/65.7 |
| 6,105,696 A | * | 8/2000 | Chen ......................... 180/65.8 |
| 6,119,800 A | * | 9/2000 | McComber ................ 180/65.7 |

* cited by examiner

Primary Examiner—Sherry Estremsky
(74) Attorney, Agent, or Firm—Kenyon & Kenyon

(57) ABSTRACT

The invention relates to a multi-motor drive in which two electric motors which are assigned to a common output with a dual-stage gearbox are provided. An automatic controller controls, on the one hand, the load distribution between the motors and, on the other hand, the gearbox in order to ensure an optimum degree of efficiency of the drive. Asynchronous motors are preferably provided.

5 Claims, 1 Drawing Sheet

MULTI-MOTOR DRIVE FOR MOTOR VEHICLES

BACKGROUND OF THE INVENTION

1. Technical Field

The present invention relates in general to motor vehicles. More particularly, the present invention relates to a truly unique and versatile assembly of electric motors for a motor vehicle.

2. Discussion

The invention relates to a multi-motor drive which is suitable for motor vehicles and in which two electric motors are assigned to a common output, which can be corrected in terms of drive to driven vehicle wheels, and to an autonomous controller which permits the motors to be operated with different load distribution, the controller permitting a load distribution which brings about an optimum degree of efficiency of the drive to be set automatically as a function of signals of a control element, e.g. accelerator pedal, which can be actuated at the driver's end, and of a signal transmitter for the travel speed or for a parameter which is correlated to it and/or analogous to it.

Until now batteries have only had a comparatively low energy density so that a battery charge for an electrically driven vehicle can provide a satisfactory range only if the electric drive is capable of operating with a high degree of efficiency. In electric motors the degree of efficiency depends heavily on the respective torque and on the rotational speed. With a multi-motor drive it is now to switch off a motor in travel situations with a relatively low power demand or to make the loading of the motors differ to a greater or a lesser extent in order to achieve a higher average degree of efficiency than would be possible with a drive with just one electric motor.

In a drive of the type specified at the beginning which is known from U.S. Pat. No. 5,289,890, two structurally different electric motors are provided, in such a way that the optimum degree of efficiency of one electric motor lies in the range of relatively low rotational speeds, and the optimum degree of efficiency of the other electric motor lies in the range of relatively high rotational speeds. As long as the power demand for the travel mode is lower than the total of the maximum powers of the two motors, it is possible, depending on the travel speed, to load mainly the one motor or the other motor, i.e. at least one motor operates in a comparatively optimum way.

SUMMARY OF THE INVENTION

Accordingly, it is an object of the invention is to permit a further improvement in the degree of efficiency.

This object is achieved according to the invention in that a gearbox which is changed automatically by the controller is arranged in the output, and the controller adjusts in each case to a gearbox state which is optimum with respect to the degree of efficiency.

According to one preferred embodiment of the invention, there is provision to use electric motors of the same type for this.

The invention is based on the general idea of using a change speed gearbox to change the respective motor speed and the motor moment which is necessary for the respective travel state of the vehicle with respect to an optimum degree of efficiency of this. As a result, an increased degree of efficiency is made possible within a significantly enlarged range of operating situations. In particular, it is possible to use two electric motors of the same type to ensure a good degree of efficiency and/or an increased degree of efficiency at both high and low travel speeds, because operating situations with very low degrees of efficiency of the electric motors can virtually always be avoided.

The controller preferably also takes into account the degree of efficiency of the gearbox which is dependent on a wide range of parameters, in particular the rotational speed and torque as well as the temperature, in order to set the load distribution between the motors and to set the respective gear speed with the aim of achieving an optimum overall degree of efficiency of the drive.

For the sake of its robustness and good control characteristics, asynchronous motors are preferred for the invention. Said motors have—expressed in simple terms—generally a good degree of efficiency if, on the one hand, the rotational speed lies above a mean rotational speed value and the motor has to operate with a mean torque. Furthermore, a good degree of efficiency is also achieved if the motor is operating at a mean rotational speed and the respective motor torque lies above a mean value. By appropriately changing the gear speed of the gearbox and connecting into the circuit or disconnecting the second motor and/or by loading the two motors in a non-uniform way it is then possible for the controller to achieve an optimum degree of efficiency.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be read in conjunction therewith, and like reference numerals are employed to designate identical components in various views.

DETAILED DESCRIPTION OF THE PREFERRED EMBODIMENT

A new and truly versatile electric motor assembly and control method is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
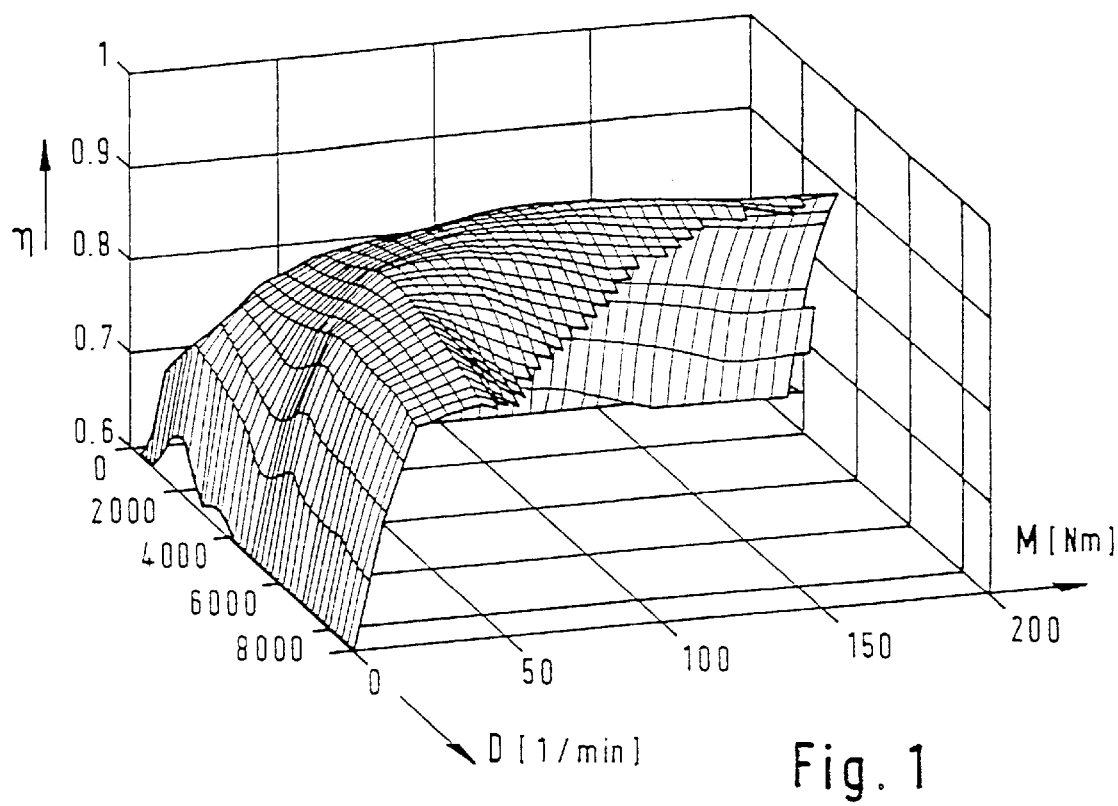
FIG. 1 shows an exemplary characteristic diagram of an asynchronous motor.

In FIG. 1, the degree of efficiency $\eta$ is represented as a function of the rotational speed D and of the motor torque M. It is apparent that comparatively high degrees of efficiency are achieved if the motor torque lies at a mean value, at approximately 75 Nm in the illustrated example, and the rotational speed exceeds a mean value, approximately 3000/min in the illustrated example, or if rotational speed is at a mean value, approximately 3000/min in the illustrated example, and the motor torque lies above a mean value, approximately 75 Nm in the illustrated example.

Outside the parameters specified above, the degree of efficiency decreases severely under certain circumstances.

Figure 2:
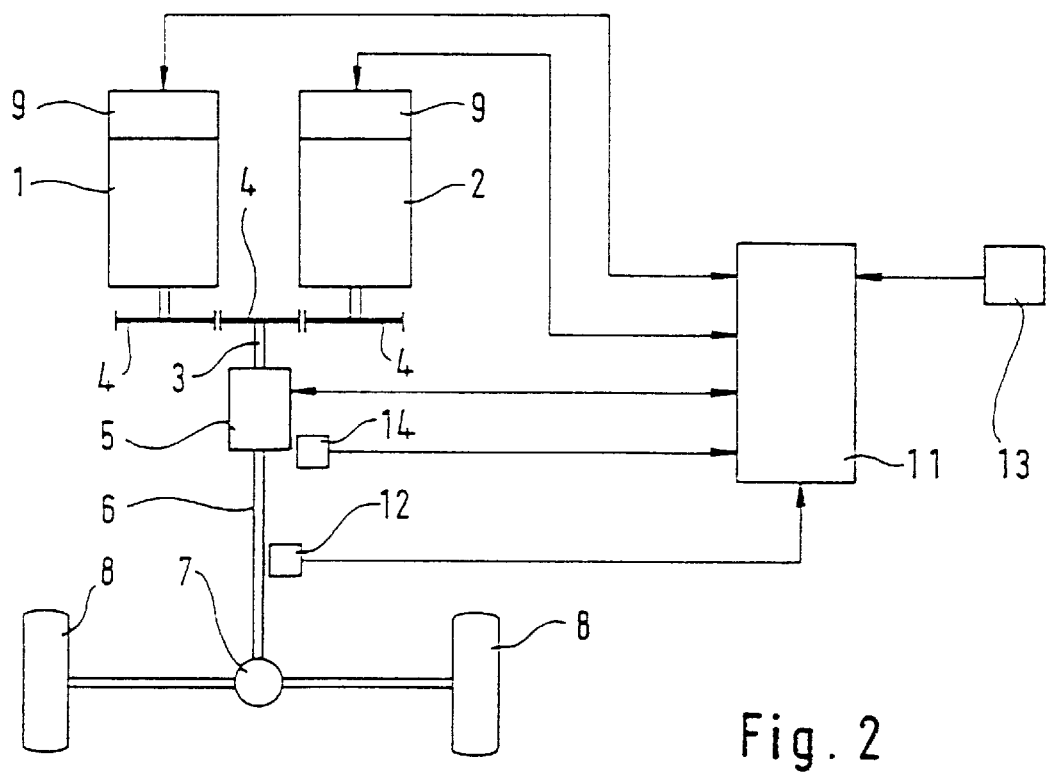
FIG. 2 shows a highly diagrammatic representation of the drive according to the invention.

According to FIG. 2, a drive according to the invention has two electric motors 1 and 2 which are connected in terms of drive in parallel to a shaft 3 via gear wheels 4 or the like. The shaft 3 forms the input of a dual-stage gearbox 5 whose output is connected in terms of drive via a shaft 6 and a differential mechanism 7 to drive wheels 8 of a motor vehicle (otherwise not illustrated in more detail).

The electric motors 1 are provided with electric power via separately controllable converters 9 which are connected themselves to a battery (not illustrated) and are controlled by an electronic controller 11.

The controller 11 is connected at the input end to a sensor 12 for the travel speed and to a signal transmitter 13 which is actuated at the driver's end, for example by means of a control element such as an accelerator pedal. In the illustrated example, the sensor 12 senses the rotational speeds of the shaft 6 which are correlated to the travel speed of the vehicle. The signals of the signal transmitter 13 represent the overall motor power desired by the driver.

Furthermore, the controller also evaluates the signals which are transmitted to the converters, and the energization of the electric motors 1 and 2 which is effected via the converters 9, so that the controller "knows" the respective motor torque. the controller 11 "knows" the respective transmission ratio of the gearbox 5 by means of the signals of the sensor 12 and by means of a gearbox-end sensor 14, the controller 11 can also respectively determine the rotational speed of the motors 1 and 2.

Accordingly, the controller 11 can also sense the respective degree of efficiency with which the electric motor 1 or 2 is operating.

In order to optimize the degree of efficiency, the controller 11 then has, on the one hand, the possibility of changing the gear speed of the gearbox 5, with the consequence that the torque which is required at the motor end is increased or reduced depending on the gear-changing direction.

Furthermore, the controller 11 can also allow the electric motors 1 and to operate with different powers and/or with different torques by appropriately activating the converters 9, it being possible for one of the electric motors 1 and 2 to "idle" in an extreme case.

An operating situation which is optimum in terms of the overall degree of efficiency can be set within an extremely short time by virtue of the fact that the controller 11 uses in each case an integrated computer to "calculate" the possibilities, which depend on the respective travel circumstances, of equal or unequal loading of the motors 1 and 2, and the possibilities of the two gear speeds of the gearbox 5, preferably also taking into account the degree of efficiency of a gearbox which varies depending on the operating state of the drive.

The foregoing description constitutes the preferred embodiments devised by the inventors for practicing the invention. It is apparent, however, that the invention is susceptible to modification, variation and change that will be obvious to those skilled in the art. Inasmuch as the foregoing description is to enable one skilled in the pertinent art to practice the invention, it should not be construed to be limited thereby but should be construed to include such aforementioned obvious variations and be limited only by the proper scope or fair meaning of the accompanying claims.

What is claimed is:

1. Multi-motor drive for use in a motor vehicle comprising:
    a common output which can be connected in terms of drive to driven vehicle wheels;
    two electric motors assigned to said common output;
    an autonomous controller operatively connected to said two electric motors which permits said motors to be operated with different load distribution, said controller permitting a load distribution which brings about an optimum degree of efficiency to be set automatically as a function of signals of a control element which can be actuated at the driver's end and signals of a signal transmitter related to the travel speed of the motor vehicle; and
    a gearbox which can be changed automatically by the controller, said gearbox is arranged in the output, the controller selecting the gear speeds with respect to an optimum degree of efficiency.

2. Drive according to claim 1, wherein said electric motors of the same type are provided.

3. Drive according to claim 2, wherein said motors are asynchronous motors.

4. Drive according to claim 3, wherein said gearbox is a dual-stage gearbox with two selectable gear transmission ratios.

5. Drive according to claim 4, wherein said the controller also takes into account the degree of efficiency of the gearbox, and sets or selects the gear transmission ratio of the gearbox and the load distribution of the motors with respect to an optimum overall degree of efficiency of the drive.

* * * * *